(12) United States Patent
Cui et al.

(10) Patent No.: US 11,828,236 B2
(45) Date of Patent: Nov. 28, 2023

(54) SPEED REDUCER AND FRACTURING APPARATUS

(71) Applicant: Yantai Jereh Petroleum Equipment & Technologies Co., Ltd., Yantai (CN)

(72) Inventors: Haiping Cui, Yantai (CN); Xiaosong Wei, Yantai (CN); Wenping Cui, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 18/089,599

(22) Filed: Dec. 28, 2022

(65) Prior Publication Data

US 2023/0167776 A1  Jun. 1, 2023

Related U.S. Application Data

(63) Continuation of application No. PCT/CN2022/070962, filed on Jan. 10, 2022.

(30) Foreign Application Priority Data

Nov. 29, 2021  (CN) .......................... 202122959124.0

(51) Int. Cl.
*F16H 1/28* (2006.01)
*F02C 7/36* (2006.01)

(52) U.S. Cl.
CPC ................. *F02C 7/36* (2013.01); *F16H 1/28* (2013.01); *F05D 2220/32* (2013.01); *F05D 2260/40311* (2013.01)

(58) Field of Classification Search
CPC .......... F16H 1/28; F02C 7/36; F05D 2200/32; F05D 2260/40311
See application file for complete search history.

(56) References Cited

U.S. PATENT DOCUMENTS

| | | | | |
|---|---|---|---|---|
| 3,190,414 A | * | 6/1965 | Maurer ..................... | H02K 7/10 475/299 |
| 2006/0094562 A1 | * | 5/2006 | Kleinmann ........... | E05F 15/611 475/317 |
| 2019/0383360 A1 | * | 12/2019 | Schulz ................. | B60K 7/0007 |
| 2020/0182137 A1 | * | 6/2020 | Carr ........................ | F02B 39/12 |
| 2021/0071752 A1 | * | 3/2021 | Cui ......................... | F16H 57/10 |
| 2023/0078445 A1 | * | 3/2023 | Kopecek .................. | F16H 1/28 74/89.39 |

* cited by examiner

*Primary Examiner* — Edwin A Young
(74) *Attorney, Agent, or Firm* — XSENSUS LLP (57) ABSTRACT

The application discloses a speed reducer and a fracturing apparatus, the speed reducer may be used to connect to a turbine engine and comprises a housing, a planet carrier, a connecting flange, a planet shaft, a planet gear, a sun gear, a ring gear, an input shaft and an output shaft; the housing may be connected to the planet carrier, the connecting flange may be connected to the planet carrier and may be used to connect to the turbine engine; the planet shaft may be connected to the planet carrier, the planet gear may be sleeved on the planet shaft, one end of the input shaft may be used to connect to an output end of the turbine engine and the other end of the input shaft may be sleeved with the sun gear which is engaged with the planet gear, the ring gear may be engaged with the planet gear and connected to the output shaft.

10 Claims, 6 Drawing Sheets

SPEED REDUCER AND FRACTURING APPARATUS

CROSS-REFERENCE TO RELATED APPLICATIONS

The present application is a continuation of International Patent Application No. PCT/CN2022/070962, filed on Jan. 10, 2022, which claims the benefit of priority from the Chinese Patent Application No. 202122959124.0, filed on Nov. 29, 2021, entitled "SPEED REDUCER AND FRACTURING APPARATUS", the entire content of each is incorporated herein by reference.

TECHNICAL FIELD

The application relates to the field of transmission technology, and particularly relates to a speed reducer and a fracturing apparatus.

BACKGROUND

With the continuous progress of fracturing technology, fracturing operations have been evolving in the direction of development of deep wells, thus the pressure during construction process gets higher and higher and the pumping rate of operations goes higher and higher as well, which proposes higher requirements for power of fracturing apparatus.

Currently, a diesel engine is typically employed to drive a fracturing device of the fracturing apparatus, but both the diesel engine and a speed reducer used in cooperation with the diesel engine have limited power, which makes the fracturing apparatus incapable of carrying out high-power operations. In addition, as the energy source of diesel engines is diesel that is more likely to bring about environmental pollution problems, it will make the fracturing apparatus fail to meet emission requirements.

SUMMARY

The purpose of some embodiments of the application is to provide a speed reducer and a fracturing apparatus, which can solve the problems that the fracturing apparatus is incapable of carrying out high-power operations and brings severe pollution to the environment.

In order to solve the above-mentioned technical problems, the application is implemented as follows.

In a first aspect, an embodiment of the application provides a speed reducer for connecting to a turbine engine, the speed reducer comprises a housing, a planet carrier, a connecting flange, a planet shaft, a planet gear, a sun gear, a ring gear, an input shaft and an output shaft;

the housing is connected to the planet carrier, the connecting flange is connected to the planet carrier and is used to connect to the turbine engine;

the planet shaft is connected to the planet carrier, the planet gear is sleeved on the planet shaft, one end of the input shaft is used to connect to an output end of the turbine engine, and the other end of the input shaft is sleeved with the sun gear that is engaged with the planet gear, the ring gear is engaged with the planet gear and is connected to the output shaft.

In a second aspect, an embodiment of the present application provides a fracturing apparatus which comprises a fracturing device, a turbine engine, and a speed reducer, the turbine engine is connected to the fracturing device by the speed reducer, and the speed reducer is the speed reducer described above.

In an embodiment of the application, the input shaft of the speed reducer is connected to the output end of the turbine engine, at the same time, the housing, the planet carrier and the connecting flange of the speed reducer are connected together to form a peripheral structure with high structural strength, the peripheral structure is connected to the turbine engine, such that the speed reducer can withstand the high rotation speed output by the turbine engine, thereby reliably driving the fracturing device to work. The requirements of carrying out high-power operations by the fracturing device, based on the high power of the turbine engine, can be met. At the same time, the power source of the turbine engine is natural gas which is clean energy, therefore, the solution can solve the problems that the fracturing apparatus is incapable of carrying out high-power operations and brings severe pollution to the environment.

LIST OF REFERENCE SIGNS

110: housing
120: planet carrier
130: connecting flange
140: planet shaft
150: planet gear
151: first gear
152: second gear
160: sun gear
161: first transmission teeth
162: third transmission teeth
163: fourth transmission teeth
170: ring gear
171: ring gear part
172: connecting part
180: input shaft
181: second transmission teeth
190: output shaft
191: first toothed disc
210: first elastic member
220: first bearing
230: first platen
240: gland 250: second elastic member
260: second bearing
270: second platen
280: output flange
281: second toothed disc
290: brake disc
310: brake caliper
410: third bearing
420: dowel pin
430: first screw
440: second screw
450: first bolt assembly.

DETAILED DESCRIPTION

Technical solutions in embodiments of the application will be described clearly and thoroughly below with reference to the accompanying drawings of embodiments of the application. Obviously, the described embodiments are part of the embodiments of the application rather than all of them. All other embodiments obtained by a person skilled in the art without creative work based on embodiments in the application fall within the protection scope of the application.

The terms "first", "second", and the like in the description and claims of the application are used to distinguish between similar objects rather than describing a specific order or a sequence. It is to be understood that terms used in such a way may be interchanged where appropriate, such that embodiments of the application can be implemented in an order other than those illustrated or described herein. In addition, "and/or" in the description and claims indicates at least one of the objects associated therewith, and the character "/" generally indicates that the objects associated therewith before and after are in an "or" relationship.

The speed reducer and fracturing apparatus provided by an embodiment of the application will be described in detail by a particular embodiment and application scenarios thereof with reference to the accompanying drawings.

Referring to FIGS. 1 to 13, an embodiment of the application discloses a speed reducer, the speed reducer is used to connect to a turbine engine, so as to transmit the power output by the turbine engine to a fracturing device, wherein the fracturing device can comprise a plunger pump. The speed reducer can comprise a housing 110, a planet carrier 120, a connecting flange 130, a planet shaft 140, a planet gear 150, a sun gear 160, a ring gear 170, an input shaft 180 and an output shaft 190.

Figure 1:
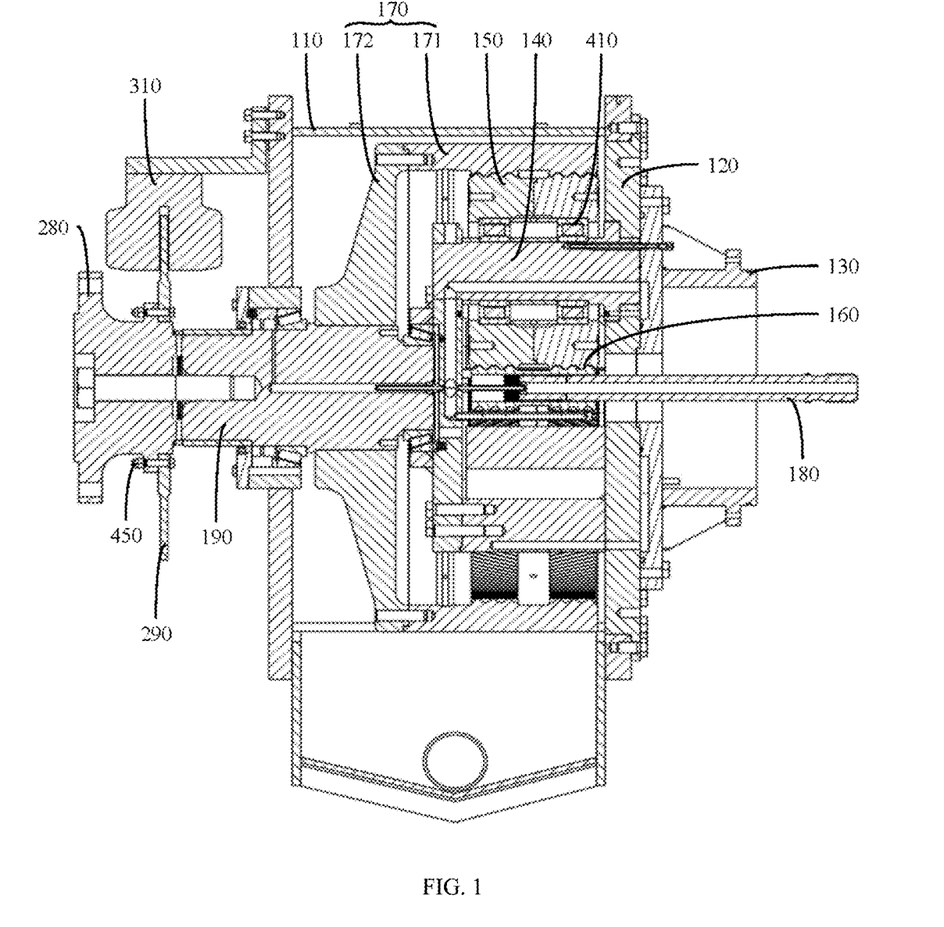
FIG. 1 is a cross-sectional view of a speed reducer disclosed in an embodiment of the application.

The housing 110 can serve as a basic component of the speed reducer, which is used to provide a basis of installation for other components comprised in the speed reducer. The housing 110 is connected to the planet carrier 120. Optionally, the position at which the housing 110 and the planet carrier 120 are connected to each other can be one side of the housing 110 that is closer to the turbine engine. Optionally, the housing 110 and the planet carrier 120 can be detachably connected to each other by connecting parts such as screws, so as to facilitate disassembly and assembly. The connecting flange 130 is connected to the planet carrier 120. Optionally, the connecting flange 130 and the planet carrier 120 can be detachably connected to each other by connecting parts such as screws, so as to facilitate disassembly and assembly. The connecting flange 130 is used to connect to the turbine engine, that is, the connection between the speed reducer and the turbine engine can be achieved by the connecting flange 130, so as to ensure the positional precision between the speed reducer and the turbine engine, thereby transmitting power more reliably. The connecting flange 130 can be integrally located between the planet carrier 120 and the turbine engine after the speed reducer and the turbine engine are mounted together.

The planet shaft 140 is connected to the planet carrier 120. Optionally, both sides of the planet carrier 120 can be provided with a mounting hole and both ends of the planet shaft 140 can fit into the mounting holes respectively, such that the connection between the planet shaft 140 and the planet carrier 120 can be achieved. The planet gear 150 is sleeved on the planet shaft 140, and the planet gear 150 can rotate relative to the planet carrier 120. Optionally, the planet gear 150 and the planet shaft 140 can have a plurality of third bearings 410 arranged therebetween, such that the planet gear 150 rotates more smoothly relative to the planet shaft 140 while reducing wear of the planet wheel 150 and the planet shaft 140. In addition, there are at least two planet gears 150 and at least two planet carriers 120, respectively, and they are provided in groups so as to improve the transmission performance of the speed reducer.

Figure 4:
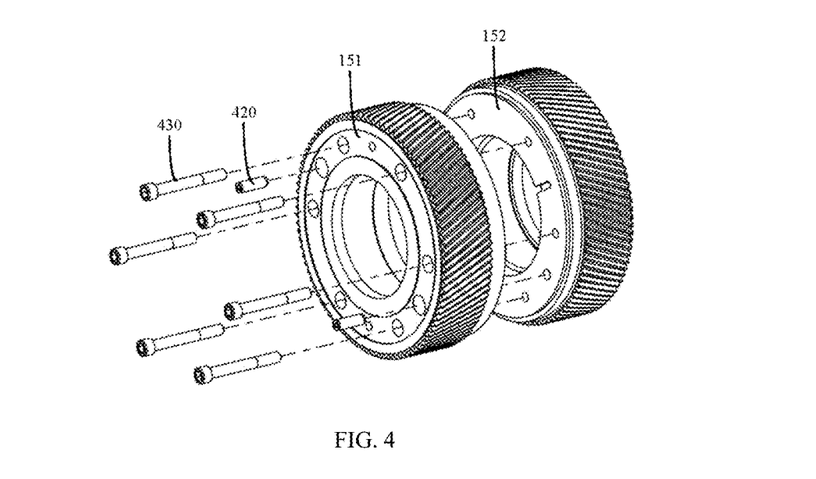
FIG. 4 is an exploded view of a planet gear disclosed in an embodiment of the application.
Figure 5:
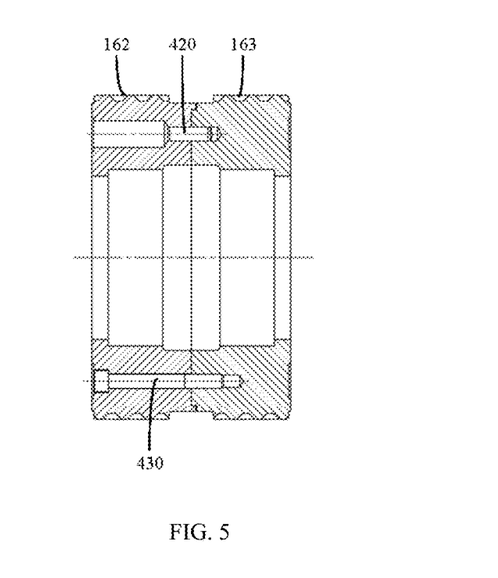
FIG. 5 is a cross-sectional view of a planet gear disclosed in an embodiment of the application.
Figure 6:
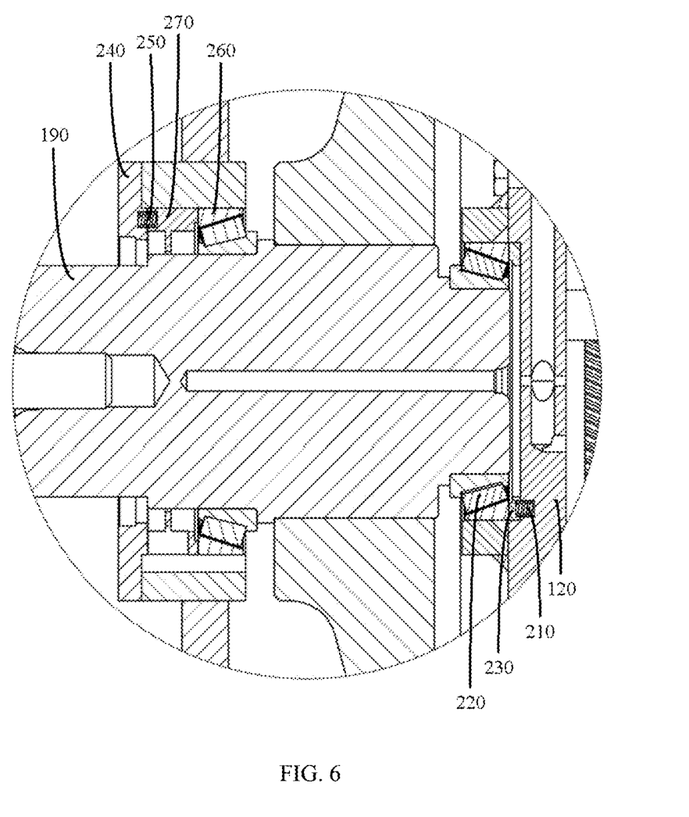
FIG. 6 is a partial cross-sectional view of a speed reducer disclosed in an embodiment of the application.
Figure 7:
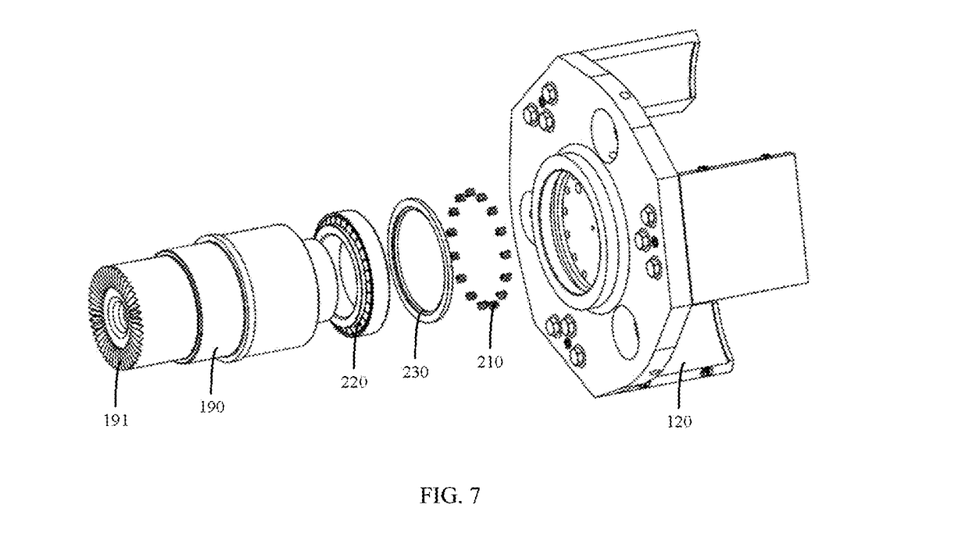
FIGS. 7 to 11 are exploded views of different parts of a speed reducer disclosed in an embodiment of the application.
Figure 8:
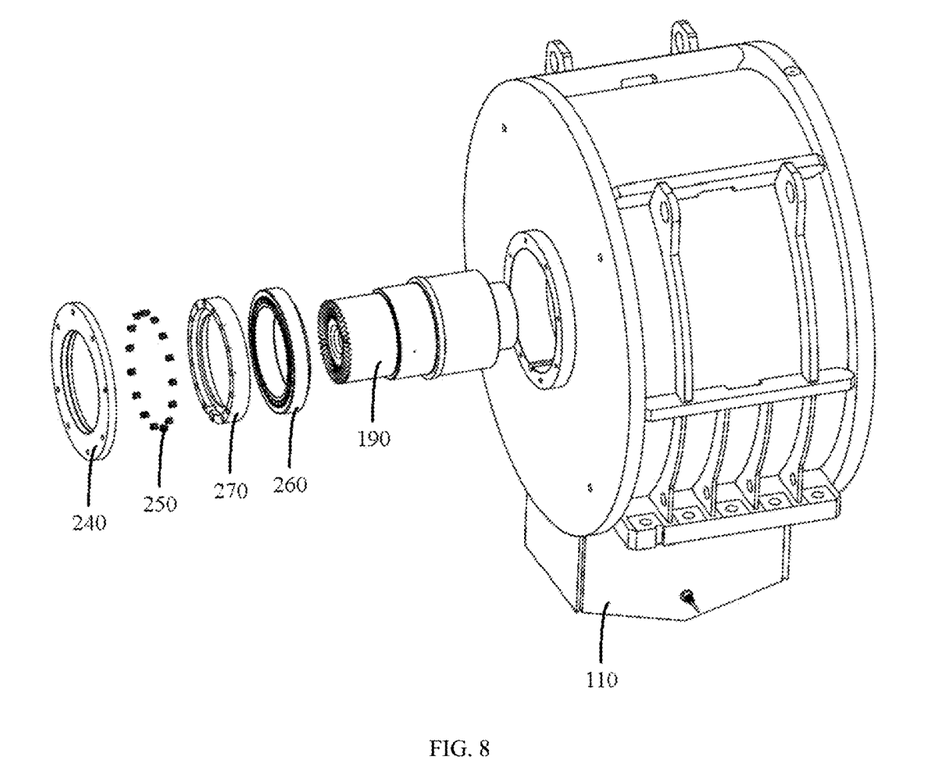
Figure 9:
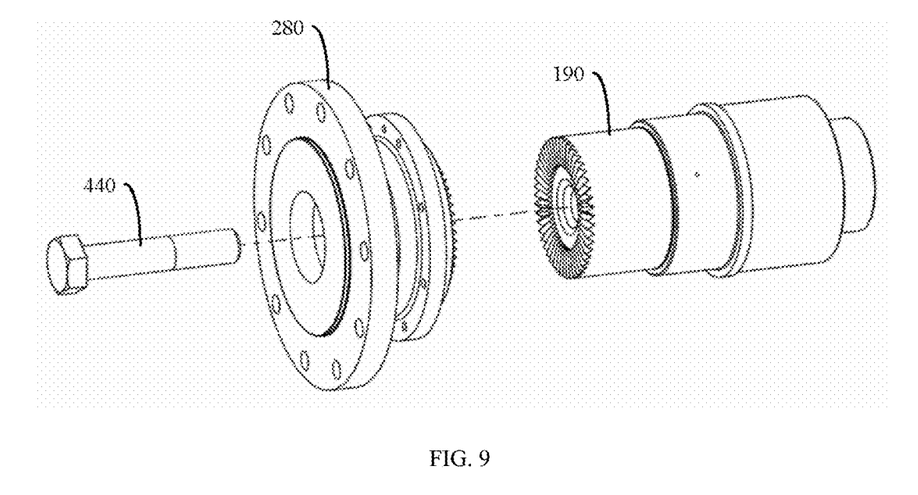
Figure 10:
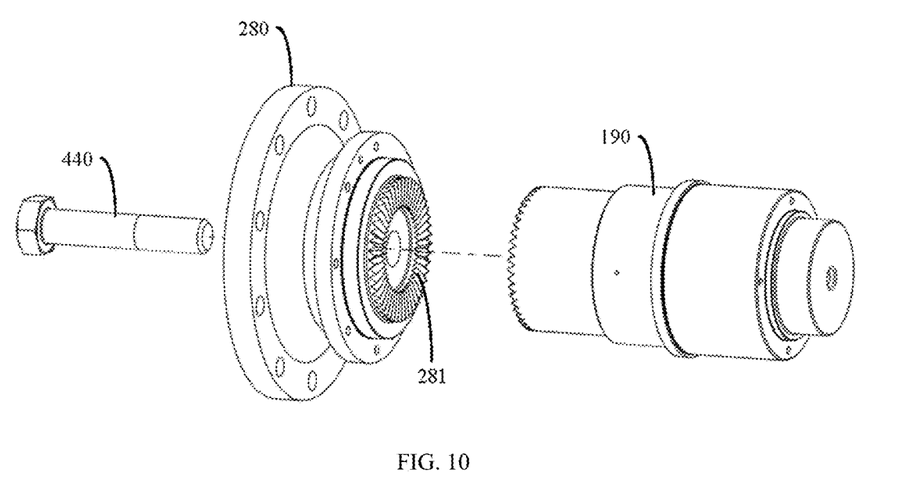
Figure 11:
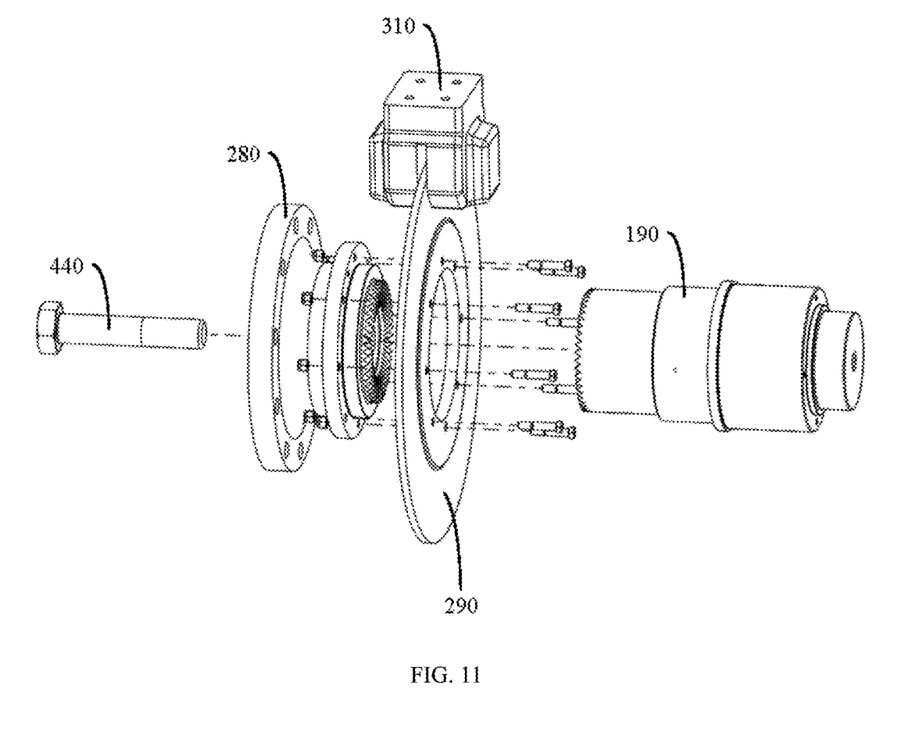

A specific structure of the planet gear 150 may be employed flexibly. Optionally, the planet gear 150 can employ a herringbone-gear-shaped structure, which has advantages such as high contact ratio, small axial load, high load-carrying capacity and stable transmission, etc. If the planet gear 150 is of an integral herringbone-gear-shaped structure, the processing difficulty of the planet gear 150 will be extremely high. In order to facilitate the processing of the planet gear 150, in alternative embodiments, the planet gear 150 comprises a first gear 151 and a second gear 152 which have opposite rotation directions, the first gear 151 and the second gear 152 are provided separately and are connected to each other. The outer peripheral surface of the sun gear 160 is provided with third transmission teeth 162 and fourth transmission teeth 163, the first gear 151 is engaged with the third transmission teeth 162, and the second gear 152 is engaged with the fourth transmission teeth 163. When processing the planet gear 150, the first gear 151 and the second gear 152 can be processed separately, then the first gear 151 and the second gear 152 can be assembled together to obtain the herringbone-shaped planet gear 150. As the difficulty of processing the first gear 151 and the second gear 152 separately is lower, the embodiment may reduce the processing difficulty of the planet gear 150.

The above-mentioned first gear 151 and second gear 152 can be directly connected to each other in a non-detachable manner such as welding, however, in order to facilitate disassembly and assembly of the planet gear 150, the first gear 151 and the second gear 152 can be assembled together in a detachable connection manner. Further, in order to improve the efficiency of disassembly and assembly of the planet gear 150, the first gear 151 and the second gear 152 can be pre-positioned by the dowel pin 420, then the first gear 151 and the second gear 152 can be fixedly connected by the first screw 430 so as to complete the assembly of the planet gear 150. Optionally, there are at least two the dowel pins 420 and at least two first screws 430, respectively, such that the connection reliability between the first gear 151 and the second gear 152 may be improved.

Figure 2:
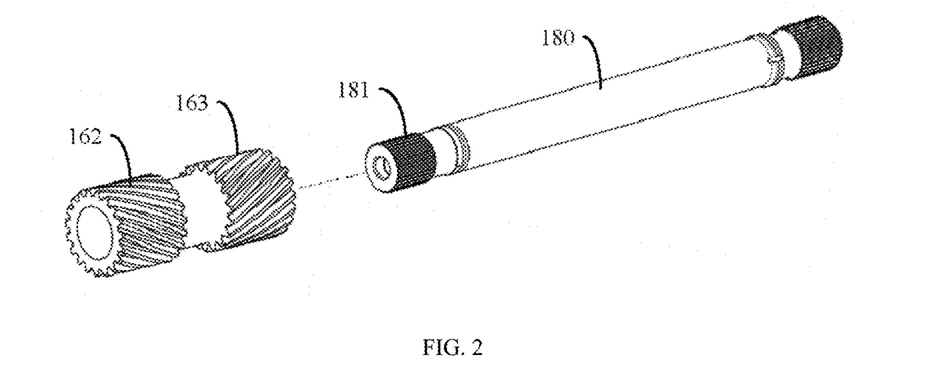
FIG. 2 is an exploded view of an input shaft and a sun gear disclosed in an embodiment of the application.
Figure 3:
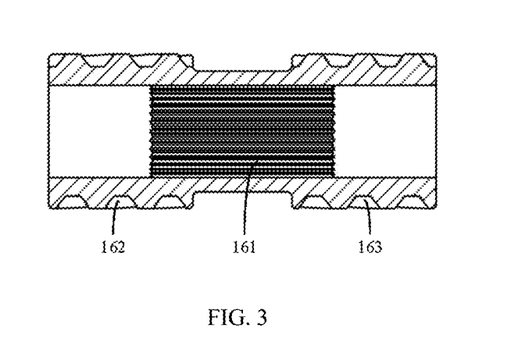
FIG. 3 is a cross-sectional view of a sun gear disclosed in an embodiment of the application.

The input shaft 180 can serve as a power input component of the speed reducer, one end of the input shaft 180 is used to connect to the output end of the turbine engine, and the other end of the input shaft 180 is sleeved with a sun gear 160, the sun gear 160 is engaged with the planet gear 150, such that the input shaft 180 can drive the sun gear 160 to rotate, and the sun gear 160 further drives the planet gear 150 to rotate. The sun gear 160 and the input shaft 180 can be integrally provided, at this point, the sun gear 160 and the input shaft 180 can form a gear shaft. In order to facilitate assembly and subsequent maintenance, the sun gear 160 and the input shaft 180 can be provided separately and have a transmission structure arranged therebetween to achieve power transmission. Optionally, the inner peripheral surface of the sun gear 160 is provided with first transmission teeth 161, the outer peripheral surface of the input shaft 180 is provided with second transmission teeth 181, and the first transmission teeth 161 is engaged with the second transmission teeth 181 so as to achieve transmission. If both the first transmission teeth 161 and the second transmission teeth 181 are teeth that extend in a straight line, the input shaft 180 and the sun gear 160 must be strictly coaxial in order to ensure the reliability of transmission, which will bring more difficulty to assembly of the speed reducer, and once the speed reducer is affected by factors such as vibration during operation, it is very likely that the contact area between the input shaft 180 and the sun gear 160 becomes too small, eventually causing wear. On this basis, the second transmission teeth 181 can be configured as crowned teeth, that is, the second transmission teeth 181 can extend along an arc. Thus, even if the input shaft 180 and the sun gear 160 are not strictly coaxial, the first transmission teeth 161 and the second transmission teeth 181 can form a larger contact area therebetween, such that it is less likely to cause wear, thus the structure can reduce the requirement for the coaxiality of the input shaft 180 and the sun gear 160. In addition, as the second transmission teeth 181 is located on the outer peripheral surface of the input shaft 180, it is more easily to form crowned teeth. Optionally, the output shaft 190 can swing 2°-5° in its own radial direction.

The ring gear 170 is engaged with the planet gear 150, and the ring gear 170 is connected to the output shaft 190. The ring gear 170 can rotate relative to the housing 110, thus when the planet gear 150 is rotating, the ring gear 170 rotates relative to the housing 110 under the effect of the planet gear 150, so as to drive the output shaft 190 to rotate, the output shaft 190 being connected to the fracturing device, thereby driving the fracturing device to operate. Optionally, the inner ring gear 170 can be provided in a integral structure or a split structure, which can specifically comprise a ring gear part 171 and a connecting part 172. The ring gear part 171 can be arranged on the outer side of the planet gear 150 and engaged with the planet gear 150, the connecting part 172 can be connected to the ring gear part 171 by connecting parts such as screws, and the connecting part 172 is sleeved on the output shaft 190 so as to achieve power transmission between the planet gear 150 and the output shaft 190. Optionally, the output shaft 190 can be disposed coaxially to the input shaft 180 so as to make the structure of the speed reducer more compact.

The output shaft 190 can rotate relative to the housing 110, and the output shaft 190 can be supported by at least two bearings in order to improve stability of the output shaft 190 during rotation. Optionally, the output shaft 190 can be rotatably connected to the planet carrier 120 by the first bearing 220 such that the output shaft 190 can be supported by the planet carrier 120. Further, the speed reducer further comprises a first elastic member or structure 210, one end of the first elastic member 210 is connected to the planet carrier 120 and the other end of the first elastic member 210 is connected to an outer ring of the first bearing 220. Optionally, the first elastic member 210 can be a spring. A force can be appropriately applied to the first elastic member 210 while assembling the speed reducer so as to deform the first elastic member 210, at this point, the first elastic member 210 can apply a force to the outer ring of the first bearing 220 such that the outer ring of the first bearing 220 is in closer contact with an roller, thereby increasing the service life of the first bearing 220.

The above-mentioned first elastic member 210 can directly contact the outer ring of the first bearing 220 so as to apply a force on the outer ring. As the contact area between the first elastic member 210 and the outer ring is relatively small, the outer ring of the first bearing 220 can be easily scratched. Therefore, in order to solve this problem, the speed reducer further comprises a first platen 230, the first elastic member 210 is connected to the outer ring of the first bearing 220 by the first platen 230. In this embodiment, the first platen 230 and the outer ring of the first bearing 220 can form a larger contact area therebetween, thereby preventing the outer ring of the first bearing 220 from being scratched. Even if the first platen 230 is scratched by the first elastic member 210, only the first platen 230 with a lower cost needs to be replaced, so essentially no additional maintenance costs are incurred.

In an alternative embodiment, the output shaft 190 can be directly connected to the housing 110 by a second bearing 260, however, the wall thickness of the housing 110 is typically small, which makes it inconvenient to dispose the second bearing 260. To this end, the speed reducer can further comprise a gland 240 which is connected to the housing 110, the output shaft 190 is rotatably connected to the gland 240 by the second bearing 260, and the gland 240 can protrude from the housing 110, which makes it more convenient to dispose the second bearing 260. Further, the speed reducer may further comprise a second elastic member or structure 250, one end of the second elastic member 250 is connected to the gland 240 and the other end of the second elastic member 250 is connected to the outer ring of the second bearing 260. Optionally, the second elastic member 250 can be a spring. A force can be appropriately applied to the second elastic member 250 while assembling the speed reducer so as to deform the second elastic member 250, at this point, the second elastic member 250 can apply a force to the outer ring of the second bearing 260 such that the outer ring of the second bearing 260 is in closer contact with an roller, thereby increasing the service life of the second bearing 260.

The above-mentioned second elastic member 250 can directly contact the outer ring of the second bearing 260 so as to apply a force on the outer ring, As the contact area between the second elastic member 250 and the outer ring is relatively small, the outer ring of the second bearing 260 can be easily scratched. Therefore, in order to solve this problem, the speed reducer further comprises a second platen 270, the second elastic member 250 is connected to the outer ring of the second bearing 260 by the second platen 270. In this embodiment, the second platen 270 and the outer ring of the second bearing 260 can form a larger contact area therebetween, thereby preventing the outer ring of the second bearing 260 from being scratched. Even if the second platen 270 is scratched by the second elastic member 250, only the second platen 270 with a lower cost needs to be replaced, so essentially no additional maintenance costs are incurred.

Figure 13:
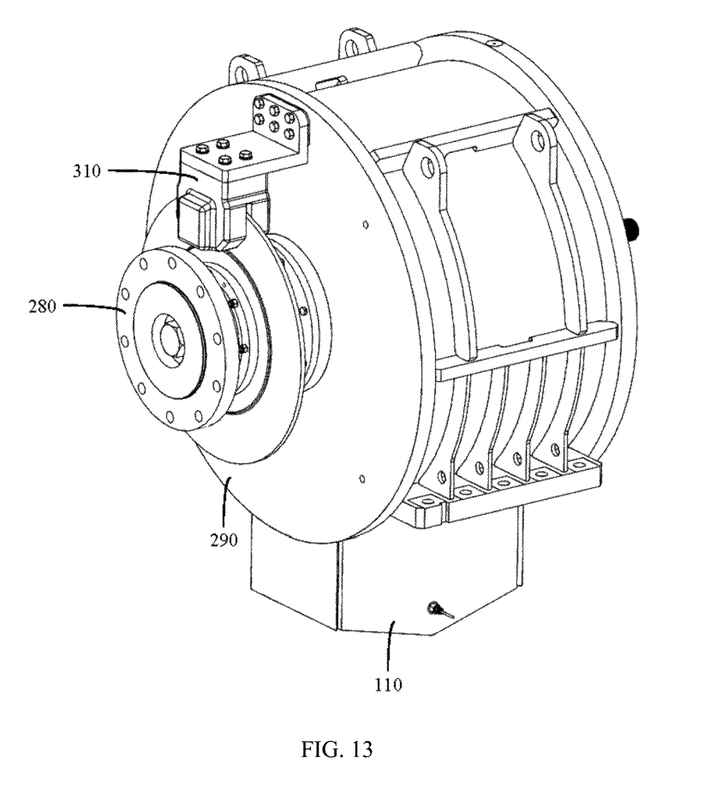
FIG. 13 is a perspective view of a speed reducer disclosed in an embodiment of the application.

Optionally, the speed reducer further comprises an output flange 280, a brake disc 290 and a brake caliper 310. The output flange 280 is coaxially connected to the output shaft 190. Optionally, the output flange 280 can be connected to the output shaft 190 by the second screw 440. The output shaft 190 can drive the fracturing device by the output flange 280. The brake disc 290 is sleeved on the output flange 280.

Optionally, the brake disc 290 can be connected to the output flange 280 by a first bolt assembly 450. The brake caliper 310 can be connected to the housing 110 by connecting parts such as screws, the brake disc 290 cooperates with the brake caliper 310 such that the brake caliper 310 can hold the brake disc 290 tightly to perform braking action. The brake disc 290 can be arranged on one side of the output flange 280 that is closer to the output shaft 190, so as to reduce a cantilever length of the brake caliper 310, thereby improving the operation reliability of the brake caliper 310. The brake caliper 310 can be provided with a hydraulic pipeline. When braking is required, pressure is generated inside the hydraulic pipeline, and the brake caliper 310 can start to operate to hold the brake disc 290 tightly, such that the output flange 280 stops rotating and the speed reducer no longer outputs rotation speed and torque; when braking is not required, no pressure is generated inside the hydraulic pipeline, and the brake caliper 310 releases the brake disc 290 so as to allow the output flange 280 to rotate, thereby outputting rotation speed and torque. It can be seen that the structure can reliably control whether the output flange 280 rotates or not, so as to flexibly perform the braking action.

Figure 12:
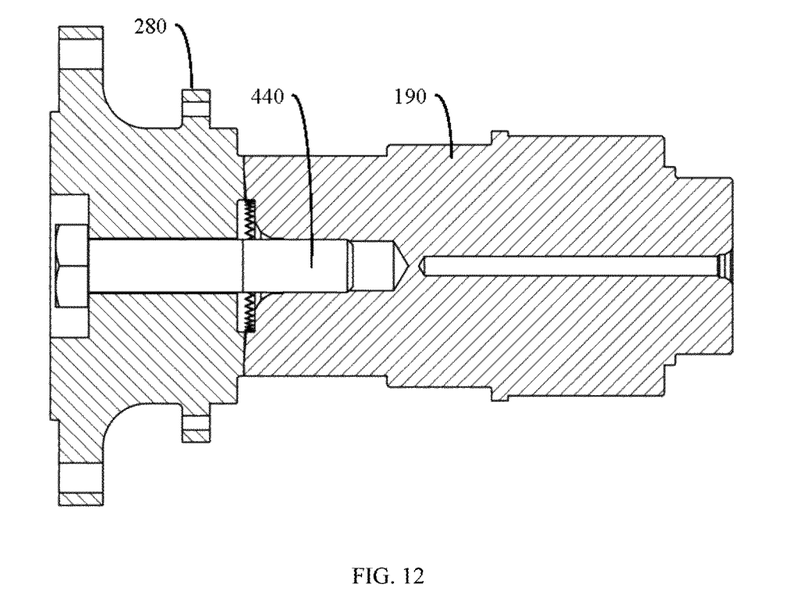
FIG. 12 is a cross-sectional view of partial structure of a speed reducer disclosed in an embodiment of the application.

The output flange 280 and the output shaft 190 can transmit power only by means of the above-mentioned second screw 440, but in order to make the transmission between the two more reliable, the transmission mode of the two can be improved. Optionally, the output shaft 190 has a first end face that faces toward the output flange 280, the output flange 280 has a second end face that faces toward the output shaft 190, the first end face is provided with a first toothed disc 191, the second end face is provided with a second toothed disc 281, and the first toothed disc 191 is engaged with the second toothed disc 281. In other words, both the first end face and the second end face are serrated end faces. As the first toothed disc 191 and the second toothed disc 281 face each other and form a larger contact area when engaged with each other, the power of the output shaft 190 can be transmitted to the output flange 280 more reliably by the first toothed disc 191 and the second toothed disc 281.

In an embodiment of the application, the input shaft 180 of the speed reducer is connected to the output end of the turbine engine, at the same time, the housing 110, the planet carrier 120 and the connecting flange 130 of the speed reducer are connected together to form a peripheral structure with high structural strength. The peripheral structure is connected to the turbine engine, such that the speed reducer can withstand the high rotation speed output by the turbine engine, thereby reliably driving the fracturing device to operate. Based on the higher power of the turbine engine, it can meet the requirements of carrying out high-power operations by the fracturing device. At the same time, the power source of the turbine engine is natural gas which is clean energy, therefore, the solution can solve the problems that the fracturing apparatus is incapable of carrying out high-power operations and brings severe pollution to the environment.

An embodiment of the application further provides a fracturing apparatus, which comprises a fracturing device, a turbine engine, and a speed reducer, the turbine engine is connected to the fracturing device by the speed reducer, and the speed reducer is the speed reducer described in any of the above-mentioned embodiments.

The embodiments of the application are described above in conjunction with the accompanying drawings, but the application is not limited to the above-mentioned specific embodiments that are merely illustrative rather than limiting, a wide variety of forms can be made by a person skilled in the art under teachings of the application without departing from the spirit of the application and the protection scope of the claims of the application, and such forms all fall within the protection scope of the application.

The invention claimed is:

1. A speed reducer for connecting to a turbine engine, comprising a housing, a planet carrier, a connecting flange, a planet shaft, a planet gear, a sun gear, a ring gear, an input shaft, and an output shaft;
   wherein the housing is connected to the planet carrier, the connecting flange is connected to the planet carrier, and the connecting flange is used to connect to the turbine engine; and
   the planet shaft is connected to the planet carrier, the planet gear is sleeved on the planet shaft, one end of the input shaft is used to connect to an output end of the turbine engine, and the other end of the input shaft is sleeved with the sun gear, the sun gear is engaged with the planet gear, the ring gear is engaged with the planet gear, and the ring gear is connected to the output shaft.

2. The speed reducer according to claim 1, wherein the speed reducer further comprises a first elastic structure, the output shaft is rotatably connected to the planet carrier by a first bearing, one end of the first elastic structure is connected to the planet carrier and the other end of the first elastic structure is connected to an outer ring of the first bearing.

3. The speed reducer according to claim 2, wherein the speed reducer further comprises a first platen, the first elastic structure is connected to the outer ring of the first bearing by the first platen.

4. The speed reducer according to claim 1, wherein the speed reducer further comprises a gland and a second elastic structure, the gland is connected to the housing, the output shaft is rotatably connected to the gland by a second bearing one end of the second elastic structure is connected to the gland and the other end of the second elastic structure is connected to an outer ring of the second bearing.

5. The speed reducer according to claim 4, wherein the speed reducer further comprises a second platen, the second elastic structure is connected to the outer ring of the second bearing by the second platen.

6. The speed reducer according to claim 1, wherein an inner peripheral surface of the sun gear is provided with first transmission teeth, an outer peripheral surface of the input shaft is provided with second transmission teeth, the first transmission teeth is engaged with the second transmission teeth and the second transmission teeth is crowned teeth.

7. The speed reducer according to claim 1, wherein the planet gear comprises a first gear and a second gear which have opposite rotation directions, the first gear and the second gear are arranged separately and are connected to each other, an outer peripheral surface of the sun gear is provided with third transmission teeth and fourth transmission teeth, the first gear is engaged with the third transmission teeth, and the second gear is engaged with the fourth transmission teeth.

8. The speed reducer according to claim 1, wherein the speed reducer further comprises an output flange, a brake disc and a brake caliper, the output flange is coaxially connected to the output shaft, the brake disc is sleeved on the output flange, the brake caliper is connected to the housing, and the brake disc is in cooperation with the brake caliper.

9. The speed reducer according to claim 8, wherein the output shaft has a first end face that faces toward the output flange, the output flange has a second end face that faces toward the output shaft, the first end face is provided with a first toothed disc, the second end face is provided with a second toothed disc, and the first toothed disc is engaged with the second toothed disc.

10. A fracturing apparatus, comprising a fracturing device, a turbine engine and a speed reducer, the turbine engine is connected to the fracturing device by the speed reducer, and the speed reducer is the speed reducer according to claim 1.

\* \* \* \* \*